US012149058B2

United States Patent
Khokle et al.

(10) Patent No.: US 12,149,058 B2
(45) Date of Patent: Nov. 19, 2024

(54) BUSHING AND CABLE GLAND INCLUDING BUSHING

(71) Applicant: Eaton Intelligent Power Limited, Dublin (IE)

(72) Inventors: Himanshu Khokle, Nagpur (IN); Prince Kumar Pandey, Bhagalpur (IN); Gangadhar Mestri, Dharwad (IN); Jayram Desai, Kolhapur (IN); Sujit Prabhakar Tarade, Ahmednagar (IN); Vinayak Manohar Chavan, Pune (IN); Umakant Patil, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/333,894

(22) Filed: Jun. 13, 2023

(65) Prior Publication Data

US 2023/0327414 A1  Oct. 12, 2023

Related U.S. Application Data

(63) Continuation of application No. 17/091,875, filed on Nov. 6, 2020, now Pat. No. 11,721,958.

(60) Provisional application No. 62/931,545, filed on Nov. 6, 2019.

(51) Int. Cl.
*H02G 3/04* (2006.01)
*F16C 17/02* (2006.01)

(52) U.S. Cl.
CPC ............... *H02G 3/04* (2013.01); *F16C 17/02* (2013.01); *F16C 2380/00* (2013.01)

(58) Field of Classification Search
USPC .......................................................... 174/650
See application file for complete search history.

(56) References Cited

U.S. PATENT DOCUMENTS

| 4,496,791 A * | 1/1985 | Reichert | H01H 9/12 439/444 |
| 4,645,648 A * | 2/1987 | Gongora | B01J 19/0053 277/641 |
| 4,712,800 A * | 12/1987 | Johnson | H02G 15/06 174/77 R |
| 4,845,314 A * | 7/1989 | Pichler | H02G 15/113 174/92 |
| 9,206,928 B2 * | 12/2015 | Haynes | F16L 5/10 |
| 2003/0101871 A1 * | 6/2003 | Scardino | B01D 53/0415 55/502 |

(Continued)

FOREIGN PATENT DOCUMENTS

| CN | 104659729 A | 5/2015 |
| CN | 105020481 A | 11/2015 |

(Continued)

OTHER PUBLICATIONS

International Search Report and Written Opinion for PCT Application No. PCT/EP2020/025495, Nov. 5, 2020, 11 pages,Rijswijk, Netherlands.

*Primary Examiner* — Krystal Robinson
(74) *Attorney, Agent, or Firm* — Stinson LLP

(57) ABSTRACT

A cable gland includes a bushing. The bushing may include a rib on an interior surface of the bushing to facilitate sealing and gripping of a cable received in the cable gland. The bushing may comprise or be formed from a silicone rubber material.

16 Claims, 7 Drawing Sheets

(56) References Cited

U.S. PATENT DOCUMENTS

| | | | | |
|---|---|---|---|---|
| 2012/0329311 A1* | 12/2012 | Duval | ............ | H01R 13/59 |
| | | | | 439/449 |
| 2016/0010768 A1* | 1/2016 | Haynes | ............ | F16L 5/10 |
| | | | | 277/314 |
| 2017/0159858 A1 | 6/2017 | Strunk | | |
| 2019/0200673 A1* | 7/2019 | Bless | ............ | A24F 40/485 |
| 2021/0226436 A1* | 7/2021 | Platt | ............ | H02G 3/22 |

FOREIGN PATENT DOCUMENTS

| | | |
|---|---|---|
| CN | 107834275 A | 3/2018 |
| CN | 207082823 U | 3/2018 |

* cited by examiner

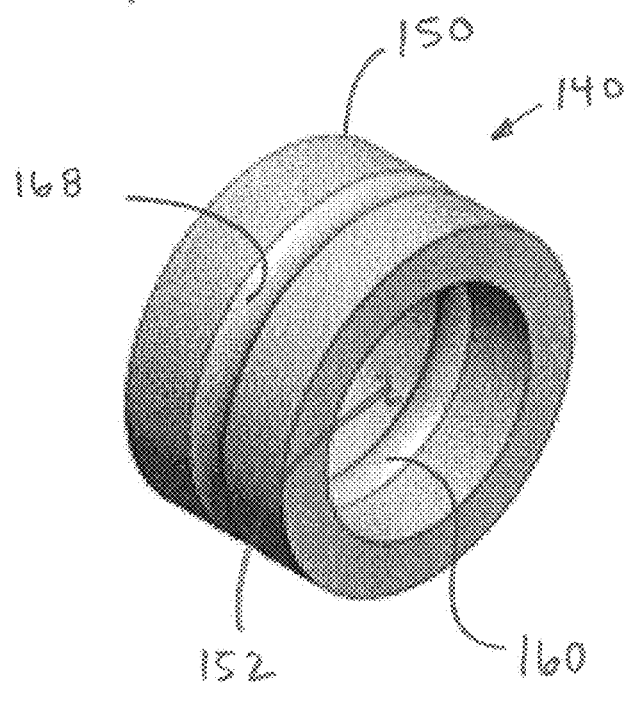
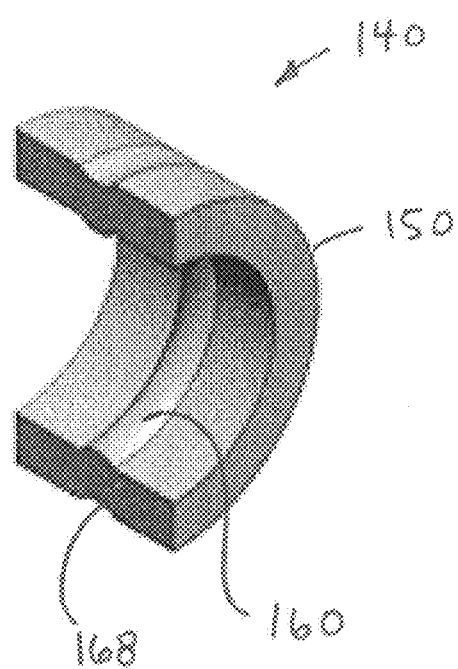

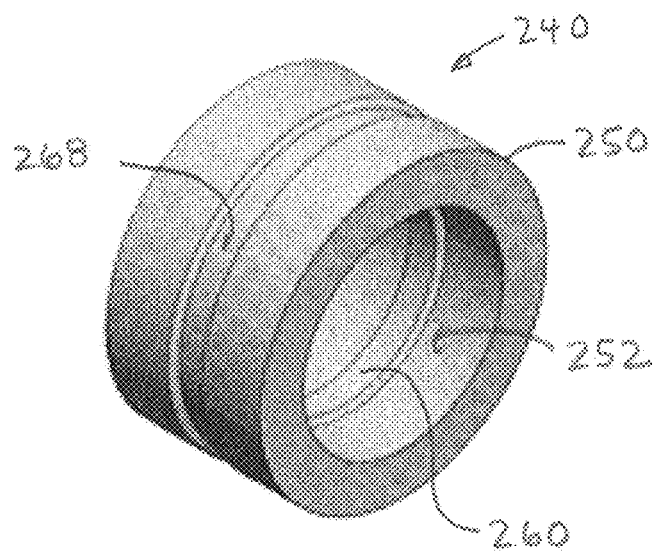
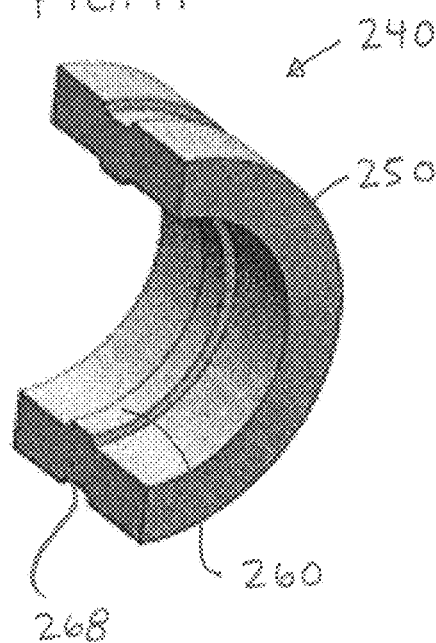
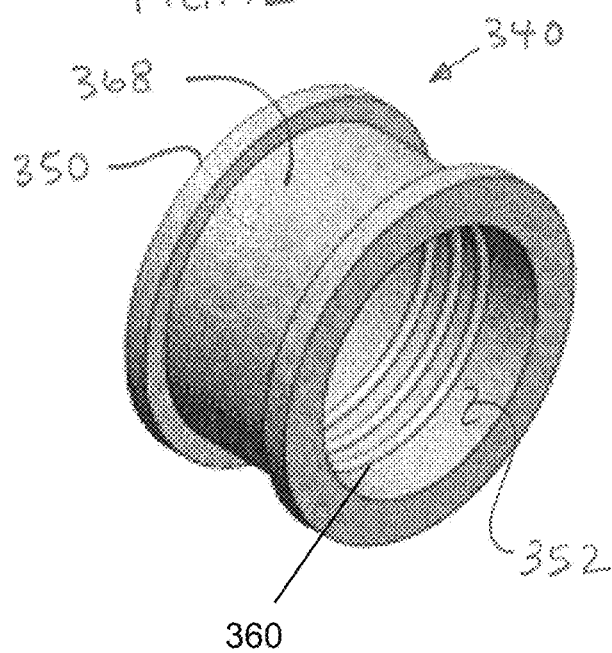
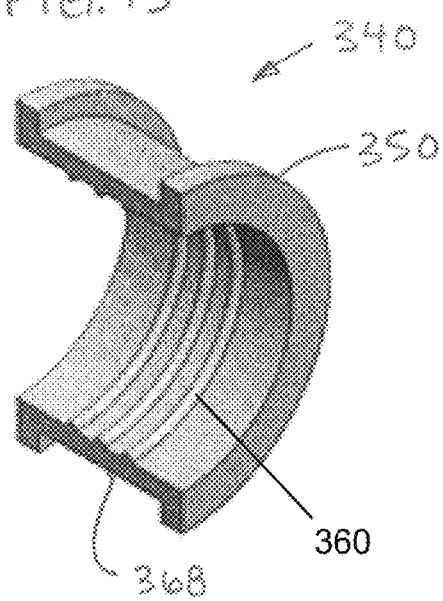

BUSHING AND CABLE GLAND INCLUDING BUSHING

STATEMENT OF RELATED CASES

This application is a Continuation Application of U.S. Ser. No. 17/091,875, filed Nov. 6, 2020, which is a Non-Provisional Application of U.S. Ser. No. 62/931,545, filed Nov. 6, 2019, the entire contents of which are incorporated herein by reference.

FIELD OF THE DISCLOSURE

The present disclosure generally relates to a bushing for a cable gland and a cable gland including the bushing.

BACKGROUND OF THE DISCLOSURE

Cable glands are used to seal the junction between a cable and a device and/or an enclosure into which the cable is extending. The cable gland may include a bushing that seals around and grips the cable. For example, the bushing may seal around a jacket of the cable.

SUMMARY OF THE DISCLOSURE

The present disclosure relates to a bushing and a cable gland including the bushing. The bushing may include a rib on an interior surface of the bushing to facilitate sealing and gripping of a cable received in the cable gland. The bushing may comprise or be formed from a silicone rubber material. Other bushing profiles are described.

BRIEF DESCRIPTION OF THE DRAWINGS

FIG. 8 is a perspective of another embodiment of a bushing for a cable gland; and FIG. 9 is a front elevation of the bushing;

FIG. 10 is a perspective of another embodiment of a bushing for a cable gland;

FIG. 11 is a front elevation of the bushing;

FIG. 12 is a perspective of another embodiment of a bushing for a cable gland;

FIG. 13 is a front elevation of the bushing;

DETAILED DESCRIPTION OF THE DISCLOSURE

Figure 1:
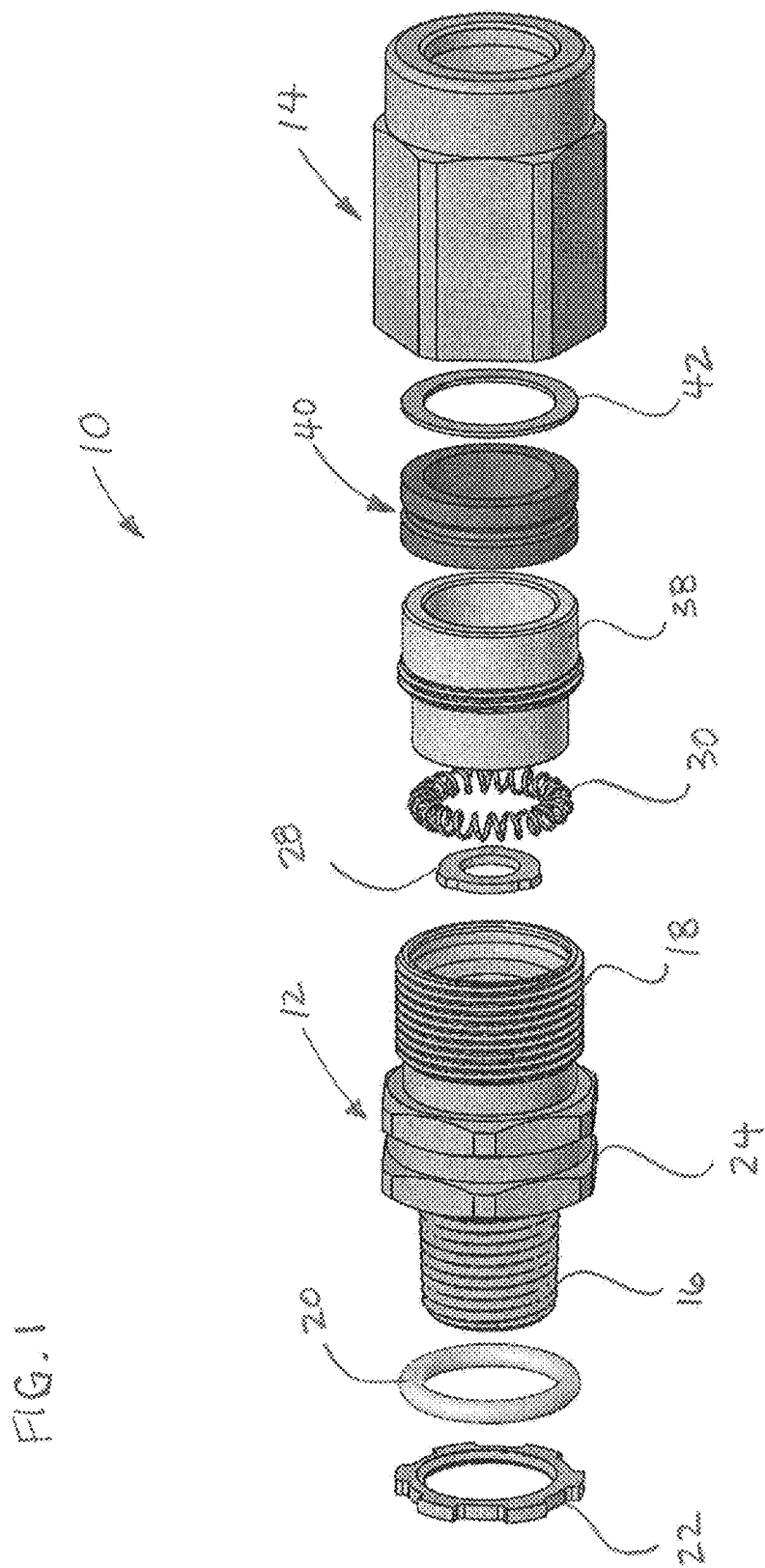
FIG. 1 is an exploded view one embodiment of a cable gland.

Referring to FIG. 1, an illustrated embodiment of a cable gland constructed according to the teachings of the present disclosure is generally indicated at reference numeral 10. In general, the cable gland 10 is configured to seal the junction between a cable and a device and/or an enclosure into which the cable is extending. As explained in more detail below, the cable gland 10 includes a bushing that seals around and grips the cable to inhibit the ingress of water and/or oil and/or other debris, such as dust. The other components of the cable gland 10, also described below, are illustrative and may be of other designs or constructions.

In general, the cable gland 10 includes a hub body, generally indicated at reference numeral 12, and a gland nut, generally indicated at reference numeral 14. Together, the hub body 12 and the gland nut 14 define a gland body. The hub body 12 has a first end with external connection thread(s) 16 for threading into a device, an enclosure, or other structure, and a second end with an external nut thread 18 for threadably mating with the gland nut 14. An internal passage extends through the first and second ends of the hub body 12. The hub body 12 may comprise or be formed from, for example, a metal, such as aluminum, stainless steel, and/or brass. A face seal 20 and a locknut 22 may be received on the first end of the hub body 20. As installed, the face seal 20 is sandwiched between an exterior face of the device, enclosure, or other structure and a tool coupling portion 24 (e.g., a hexagonal or other polygonal structure) to create the watertight seal and inhibit ingress of water, oil, and/or other debris into the device, enclosure, or other structure. The face seal 20 may comprise or be formed from, for example, silicone, such as a silicone rubber having a durometer of 70 Shore A Hardness. The locknut 22 is threaded on the connection thread 16 within the device, enclosure, or other structure and contacts the interior face of the device, enclosure, or other structure to lock the cable gland 10 to the device, enclosure, or other structure. The locknut 22 may comprise or be formed from, for example, a metal, such as aluminum, stainless steel, and/or brass. In one or more embodiments, the face seal 20 and/or the locknut 22 may be omitted. An armor stop 28 and an annular grounding spring 30 (e.g., garter spring) are received in the passage of the hub body 12, such as at the second end thereof. The armor stop 28 limits the insertion of cable armor of the cable in the cable gland 10. The armor stop 28 may comprise or be formed from, for example, plastic, such as a polyamide (e.g., nylon or nylon 6/6). The grounding spring 30 engages and surrounds the cable armor to create a grounding connection. The grounding spring 30 may comprise or be formed from, for example, metal, such as stainless steel with copper flash coating. The armor stop 28 and the grounding spring 30 may be of other designs and configurations.

Figure 2:
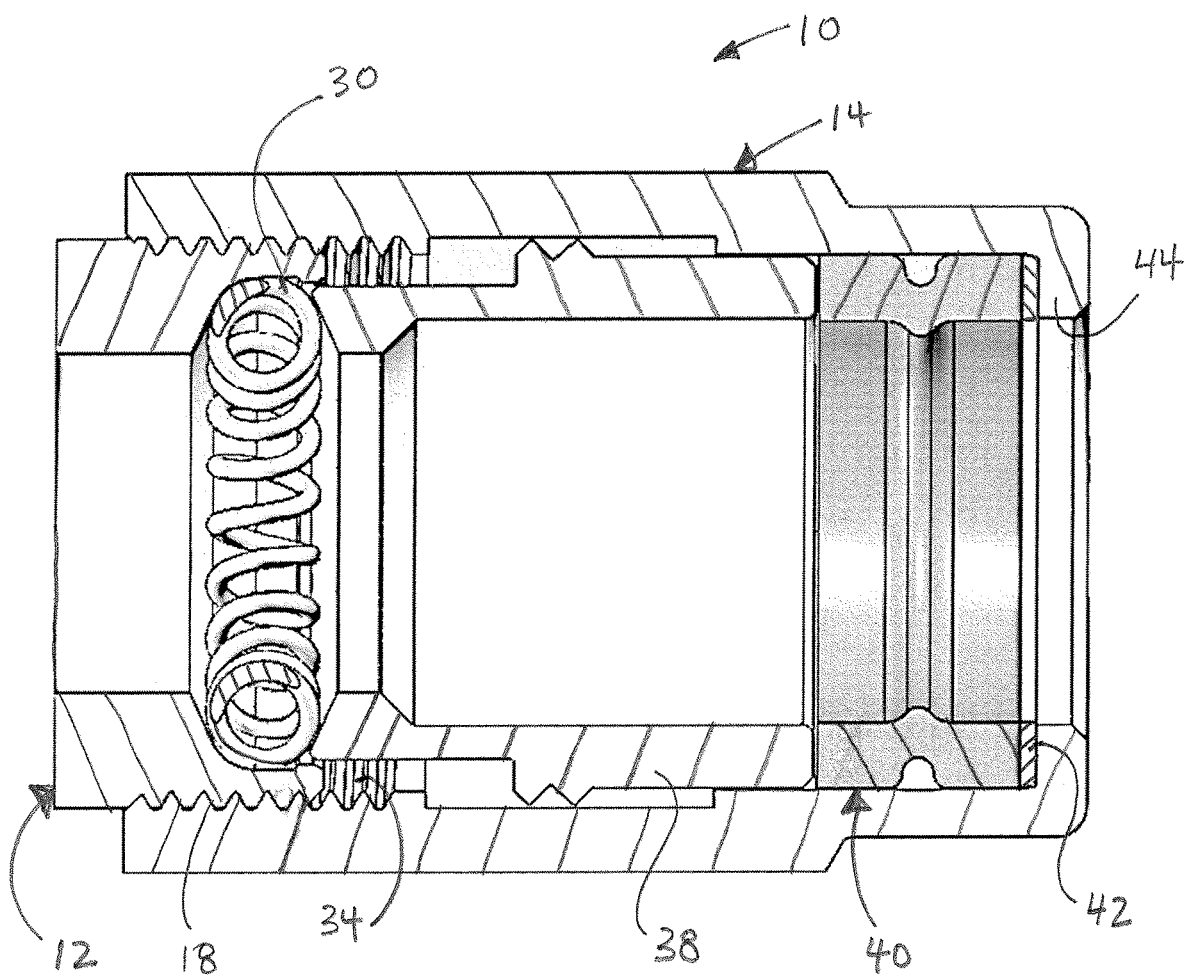
FIG. 2 is a fragmentary longitudinal section of the cable gland.

The gland nut 14 has an internal passage extending through first and second ends of the gland nut. The internal passages of the gland nut 14 and the hub body 12 are generally alignable with one another to form an internal passage of the gland body that is configured to receive the cable. The first end of the gland nut 14 includes an internal thread(s) 34 configured to threadably mate with the external nut thread 18, as shown in FIG. 2. The gland nut 14 may comprise or be formed from, for example, a metal, such as aluminum, stainless steel, and/or brass. A sleeve 38, a bushing, generally indicated at 40, and a washer 42 are received in the internal passage of the gland nut 14. When the cable gland 10 is assembled, the sleeve 38 is disposed between and engages the spring 30 and the bushing 40. The sleeve 38 guides compression of the bushing 40, as described below, and compression of the spring 30. The sleeve 38 may comprise or be formed from, for example, plastic or metal, such as aluminum, stainless steel, and/or brass. The bushing 40 is described in detail below. The washer 42 is disposed between the bushing 40 and a shoulder 44 of the gland nut 14 at the second end of the gland nut. The washer 42 distributes the load applied by the shoulder 44 of the gland nut when the cable gland 10 is assembled. The washer 42 may comprise or be formed, for example, plastic, such as a polyamide (e.g., nylon or nylon 6/6).

Figure 3:
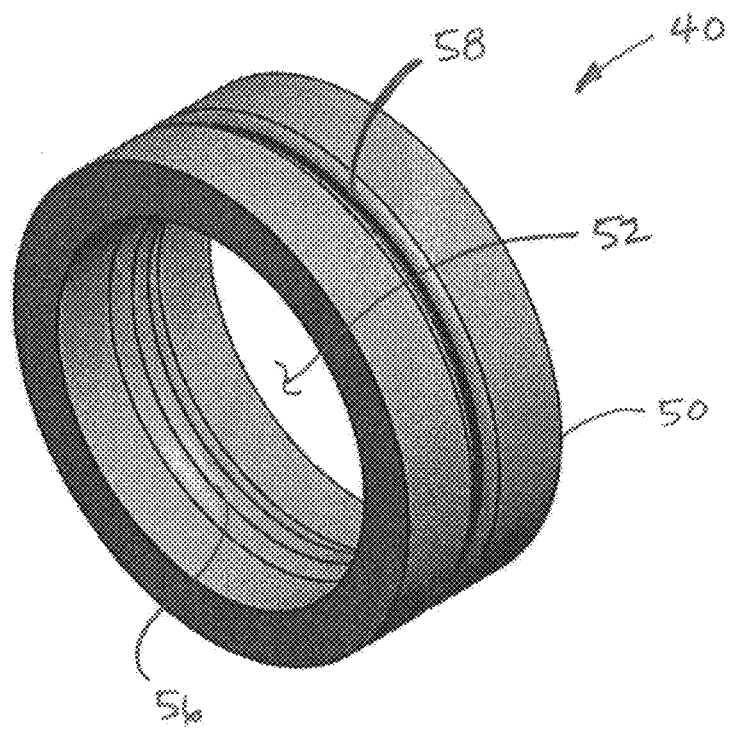
FIG. 3 is a perspective of a bushing of the cable gland.
Figure 4:
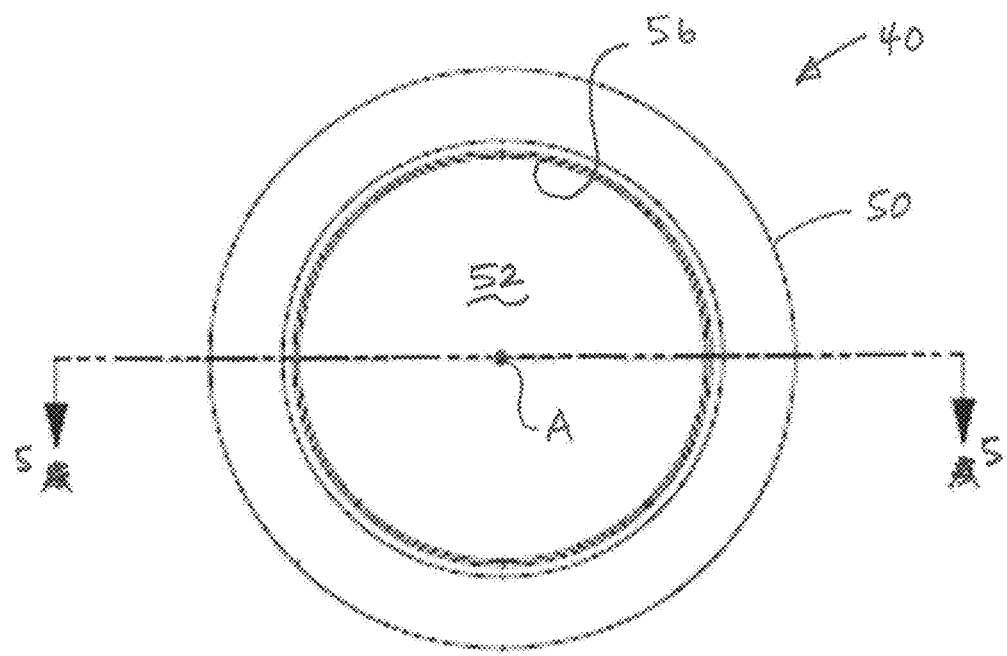
FIG. 4 is a front elevation of the bushing.
Figure 5:
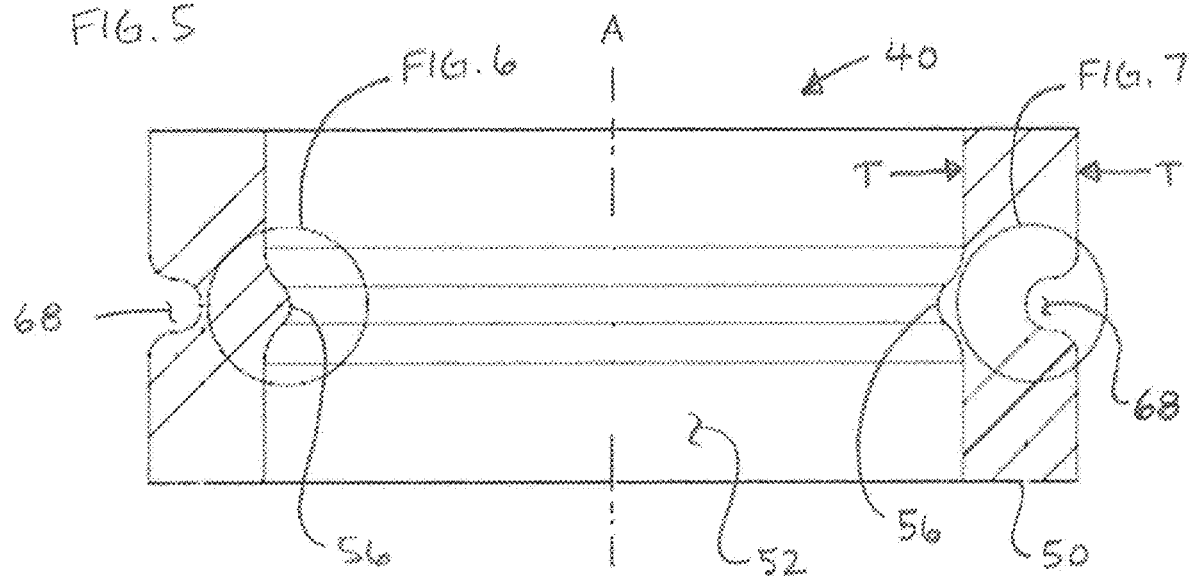
FIG. 5 is a cross section of the bushing taken in the plane including the line 5-5 in FIG. 4.
Figure 6:
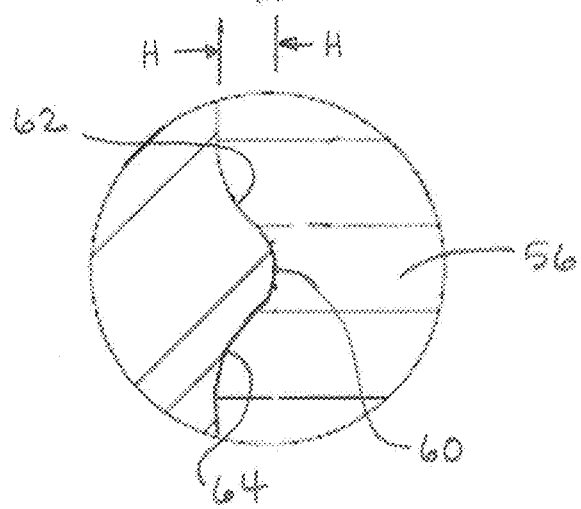
FIG. 6 is an enlarged detail view of the bushing as indicated in FIG. 6.

As shown in FIGS. 1 and 2, the bushing 40 is disposed between the sleeve 38 and the washer 42 (or shoulder 44). Referring to FIGS. 3-5, the bushing 40 comprises a bushing body 50 having a generally annular shape with an interior surface defining a bushing opening 52 extending through first and second ends of the bushing body along an axis A of the bushing body. The bushing opening 52 is generally aligned with the internal passage of the gland nut 14. A rib 56 is disposed on the interior surface of the bushing body 50. The rib 56 extends around the axis A and extends radially inward from the interior surface toward the axis. In the illustrated embodiment, the rib 56 is a continuous annulus extending along the interior surface. The rib 56 may be disposed in a midplane extending through the bushing body 50 transverse to the axis A at a location generally midway between the first and second ends of the bushing body. The rib 56 may be disposed at other locations along the axis A of the bushing body 50. The rib 56 has a suitable cross-sectional shape for engaging and sealing around the cable received in the cable gland 10, as explained below. For example, as seen best in FIGS. 5 and 6, the rib 56 has a generally rounded, convex radially inner end 60 (e.g., convex radius), and first and second end portions 62, 64 extending from the inner end to the interior surface. The illustrated first and second end portions 62, 64 of the rib 56 are generally concave and rounded (e.g., concave radius). In one example, the rib 56 has a height H extending from the interior surface measuring from about 0.25 mm to about 1.0 mm, or about 0.75 mm. The rib 56 may have other shapes and/or sizes, such as other embodiments described below.

Figure 7:
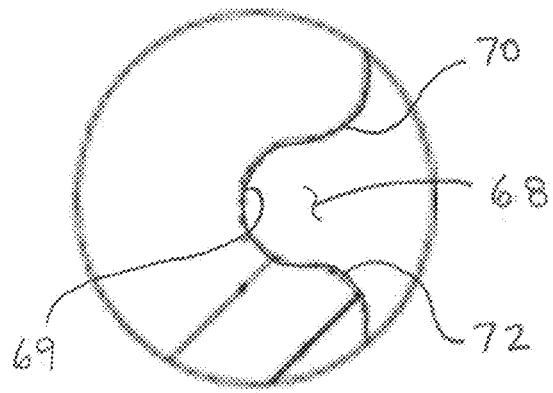
FIG. 7 is another enlarged detail view of the bushing as indicated in FIG. 6.

As shown in FIGS. 3, 5, and 7, the bushing body 40 defines a groove 68 extending radially inward toward the axis from an exterior surface of the bushing body. The groove 68 extends around the axis A, and in the illustrated embodiment, the groove 68 is a continuous annulus extending around the axis A. The illustrated groove 68 is generally aligned radially with the rib 56 relative to the axis A. The illustrated groove 68 may be disposed at other locations along the axis A of the bushing body 50. The illustrated groove 68 has a suitable cross-sectional shape to facilitate deformation (e.g., axial compression) of the bushing, as explained below. For example, as seen best in FIG. 7, the groove 68 has a generally rounded, concave radially inner end 69 (e.g., concave radius), and first and second end portions 70, 72 extending from the inner end to the exterior surface. The illustrated first and second end portions 62, 64 of the groove 68 are generally convex and rounded (e.g., convex radius). The groove 68 may have other shapes and/or sizes, such as other embodiments described below. Moreover, the groove may be omitted one or more embodiments.

The bushing 40 is configured to deform axially (i.e., compress axially) as the gland nut 14 and the hub body 12 are threadably coupled to one another. As the bushing 40 compresses, the rib 60 moves radially inward and sealingly engages and grips the cable. The groove 68 facilitates the radially inward movement of the rib 60. The rib 60 deforms or compresses (e.g., resiliently compresses) in a radially outward direction relative to the axis A as it engages the cables. In this way, the rib 60 generally conforms to the circumferential shape of the cable to provide a seal inhibiting the ingress of water, oil, and/or other debris (e.g., dust). For example, the rib 60 may seal around the jacket (e.g., PVC jacket) of the cable in one method of use. In one example, the bushing 40 is suitable for a cable gland that is rated as IP66 under International Protection Marking and/or rated NEMA 4×under the National Electrical Manufacturer Association. In one embodiment, the bushing 40 comprises or is formed from an elastomer, such as silicone rubber. A suitable silicone rubber may have durometer of about 70 Shore A Hardness. Moreover, the suitable silicone rubber is rated to withstand environmental temperatures of −60° C. to −110° C. In the illustrated embodiment, the rib 56 and the bushing body 50 are integrally formed, as a one-piece monolithic structure. For example, the bushing body 50 and the rib 56 may be molded from the silicone rubber material described above. As shown in FIG. 5, the thickness T of the material of the illustrated bushing body 50 from the exterior surface to the interior surface, not including the rib 60 and the groove 60, is generally uniform.

Other illustrated embodiments of a bushing for the cable gland 10 are illustrated in FIGS. 8-17. For each of these bushings, an interior surface and/or an internal rib generally conforms to the circumferential shape of the cable to provide a seal inhibiting the ingress of water, oil, and other debris (e.g., dust). For example, the bushing may seal around the jacket (e.g., PVC jacket) of the cable in one method of use. In one example, the bushing is suitable for a cable gland that is rated as IP66 under International Protection Marking and/or rated NEMA 4×under the National Electrical Manufacturer Association. In one embodiment, the bushing comprises or is formed from an elastomer, such as silicone rubber. A suitable silicone rubber may have durometer of about 70 Shore A Hardness. Moreover, the suitable silicone rubber is rated to withstand environmental temperatures of −60° C. to −110° C. In the illustrated embodiment, the entirety of the bushing is integrally formed, as a one-piece monolithic structure. For example, the bushing may be molded from the silicone rubber material described above.

Referring to FIGS. 8 and 9, a bushing, generally indicated at reference numeral 140, includes an annular bushing body 150. An internal rib 160 extends radially inward from an interior surface of the bushing body 150 that defines an opening 152. An exterior groove 168 defined by the bushing body 150 extends radially inward toward the axis from an exterior surface of the bushing body. The exterior groove 168 is generally aligned radially with the internal rib 160 relative to the axis of the bushing body. The internal rib 160 is generally convex and rounded. The groove 168 is generally concave and rounded.

Referring to FIGS. 10 and 11, a bushing, generally indicated at reference numeral 240, includes an annular bushing body 250. An internal rib 260 extends radially inward from an interior surface of the bushing body 250 that defines an opening 252. An exterior groove 268 defined by the bushing body 250 extends radially inward toward the axis from an exterior surface of the bushing body. The exterior groove 268 is generally aligned radially with the internal rib 160 relative to the axis of the bushing body. The internal rib 260 is generally convex and has a rectangular cross-sectional shape. The groove 268 is generally concave and has a rectangular cross-sectional shape.

Referring to FIGS. 12 and 13, a bushing, generally indicated at reference numeral 340, includes an annular bushing body 350. A plurality of internal ribs 360 (e.g., three ribs in the illustrated embodiment) extend radially inward from an interior surface of the bushing body 350 that defines an opening 352. An exterior groove 368 defined by the bushing body 350 extends radially inward toward the axis from an exterior surface of the bushing body. The exterior groove 368 has an axial dimension that is greater than the axial dimension of the previously described grooves and that extends along a majority of the axial dimension of the bushing body 350. The internal ribs 360 are generally convex and rounded. The groove 368 is generally concave and rounded.

Figure 14:
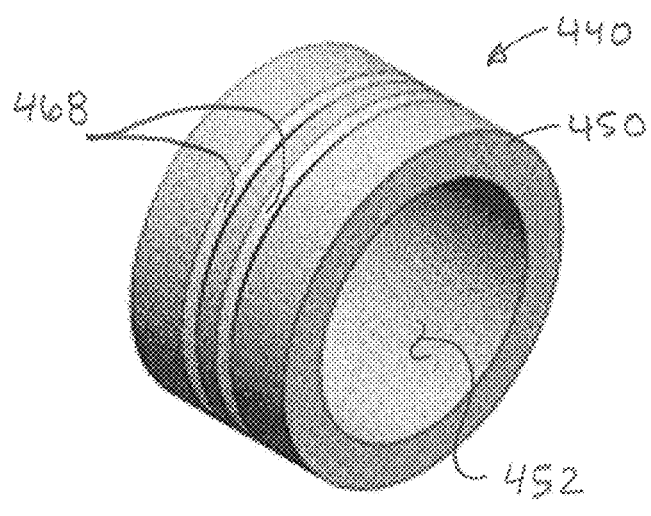
FIG. 14 is a perspective of another embodiment of a bushing for a cable gland.
Figure 15:
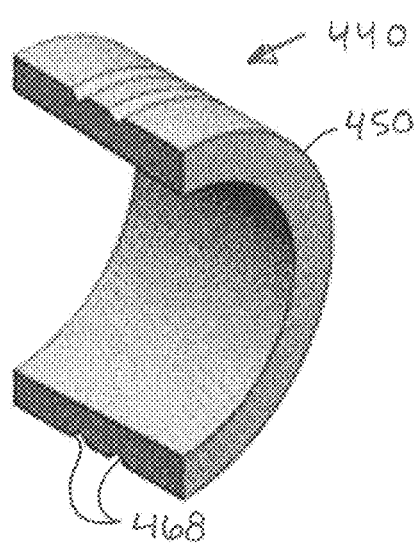
FIG. 15 is a front elevation of the bushing.

Referring to FIGS. 14 and 15, a bushing, generally indicated at reference numeral 440, includes an annular bushing body 450. An interior surface of the bushing body 450 that defines an opening 452 is free from a rib or other protrusion. A plurality of exterior grooves 468 (e.g., two grooves in the illustrated embodiment) defined by the bushing body 450 extend radially inward toward the axis from an exterior surface of the bushing body. The grooves 468 are generally concave and rounded.

Figure 16:
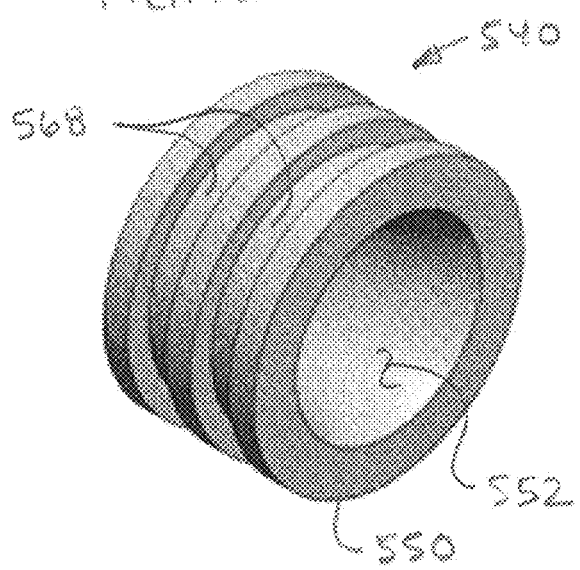
FIG. 16 is a perspective of another embodiment of a bushing for a cable gland.
Figure 17:
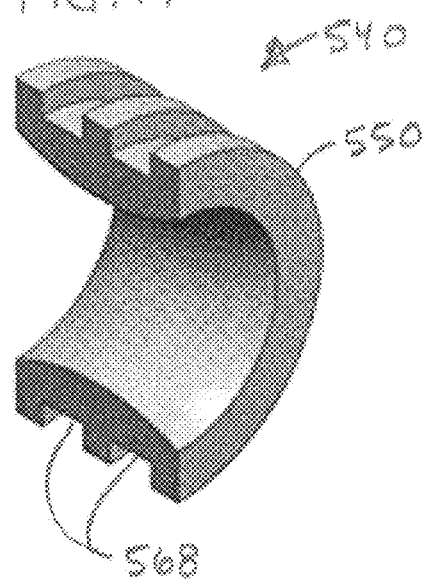
FIG. 17 is a front elevation of the bushing.

Referring to FIGS. 16 and 17, a bushing, generally indicated at reference numeral 540, includes an annular bushing body 550. An interior surface of the bushing body 550 that defines an opening 552 is free from a rib or other protrusion. However, the interior surface itself has a generally convex cross-sectional shape extending from the first and second axial ends of the bushing body 550. A plurality of exterior grooves 568 (e.g., two grooves in the illustrated embodiment) defined by the bushing body 550 extend radially inward toward the axis from an exterior surface of the bushing body. The grooves 568 have a generally rectangular cross-sectional shape.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A bushing for a cable gland, the bushing comprising:
a bushing body having a generally annular shape, the bushing body having an interior surface defining an opening extending through first and second axial ends of the bushing body, an exterior surface, and an axis extending through the first and second axial ends, wherein the bushing body is axially compressible; and
an internal rib extending radially inward from the interior surface relative to the axis of the bushing body, wherein the internal rib is configured to move radially inward relative to the axis of the bushing when the bushing body is axially compressed to sealingly engage a cable coupled to the cable gland, wherein an inner diameter of the bushing is constant along the axis of the bushing body from the first axial end to the second axial end except for at a location of the internal rib.

2. The bushing set forth in claim 1, wherein the bushing body and the internal rib are integrally formed as a single, monolithic structure.

3. The bushing set forth in claim 2, wherein the bushing body and the internal rib comprise a silicone rubber material.

4. The bushing set forth in claim 3, wherein silicone rubber material has a 70 Shore A hardness.

5. The bushing set forth in claim 4, wherein the silicone rubber material is rated to withstand environmental temperatures of −60° C. to −110° C.

6. The bushing set forth in claim 1, wherein the thickness of the bushing body between the interior and exterior surfaces is generally uniform along the axis of the bushing body.

7. The bushing set forth in claim 1, further comprising a groove defined by the bushing body, wherein the groove extends radially inward toward the axis from the exterior surface of the bushing body.

8. The bushing set forth in claim 7, wherein the groove is generally radially aligned with the internal rib relative to the axis of the bushing body.

9. The bushing set forth in claim 1, wherein the groove comprises a plurality of grooves.

10. The bushing set forth in claim 1, wherein the internal rib comprises a plurality of internal ribs spaced from one another along the axis of the bushing body.

11. The bushing set forth in claim 1, wherein the bushing includes a single internal rib.

12. A cable gland comprising:
a gland body defining an internal passage configured to receive a cable therein; and
a bushing received in the internal passage of the gland body, the bushing comprising
a bushing body having a generally annular shape, the bushing body having an interior surface defining an opening extending through first and second axial ends of the bushing body, an exterior surface, and an axis extending through the first and second axial ends, wherein the bushing body is axially compressible; and
an internal rib extending radially inward from the interior surface relative to the axis of the bushing body, wherein the internal rib is configured to move radially inward relative to the axis of the bushing when the bushing body is axially compressed to sealingly engage the cable when the cable is coupled to the cable gland, wherein an inner diameter of the bushing is constant along the axis of the bushing body from the first axial end to the second axial end except for at a location of the internal rib.

13. The cable gland set forth in claim 12, wherein the bushing body and the internal rib are integrally formed as a single, monolithic structure.

14. The cable gland set forth in claim 13, wherein the bushing body and the internal rib comprise a silicone rubber material.

15. The cable gland set forth in claim 14, wherein silicone rubber material has a 70 Shore A hardness.

16. The cable gland set forth in claim 15, wherein the silicone rubber material is rated to withstand environmental temperatures of −60° C. to −110° C.

* * * * *